(12) United States Patent
Salman

(10) Patent No.: US 10,380,793 B2
(45) Date of Patent: Aug. 13, 2019

(54) GEOBODY SURFACE RECONSTRUCTION

(71) Applicant: Schlumberger Technology Corporation, Sugar Land, TX (US)

(72) Inventor: Nader Salman, Tananger (NO)

(73) Assignee: Schlumberger Technology Corporation, Sugar Land, TX (US)

(*) Notice: Subject to any disclaimer, the term of this patent is extended or adjusted under 35 U.S.C. 154(b) by 186 days.

(21) Appl. No.: 14/891,452

(22) PCT Filed: May 15, 2014

(86) PCT No.: PCT/US2014/038021
§ 371 (c)(1),
(2) Date: Nov. 16, 2015

(87) PCT Pub. No.: WO2014/186479
PCT Pub. Date: Nov. 20, 2014

(65) Prior Publication Data
US 2016/0104317 A1 Apr. 14, 2016

(30) Foreign Application Priority Data
May 15, 2013 (FR) ...................... 13 54364

(51) Int. Cl.
*G06T 17/00* (2006.01)
*G06T 17/05* (2011.01)
(Continued)

(52) U.S. Cl.
CPC .............. *G06T 17/05* (2013.01); *G01V 1/345* (2013.01); *G01V 99/005* (2013.01);
(Continued)

(58) Field of Classification Search
CPC ............ G01V 99/005; G01V 2210/66; G01V 2210/64; G01V 1/345; G01V 1/28;
(Continued)

(56) References Cited

U.S. PATENT DOCUMENTS 9,536,022 B1 * 1/2017 Tertois ................ G01V 99/005
2007/0195087 A1 8/2007 Acosta et al.
(Continued)

FOREIGN PATENT DOCUMENTS

KR 10-1181199 B1 9/2012
WO 2010/088840 A1 8/2010

OTHER PUBLICATIONS

Manson, Josiah, Guergana Petrova, and Scott Schaefer. "Streaming surface reconstruction using wavelets." Computer Graphics Forum. vol. 27. No. 5. Blackwell Publishing Ltd, 2008.*
(Continued)

*Primary Examiner* — Xiao M Wu
*Assistant Examiner* — Scott E Sonners

(57) ABSTRACT

A method can include receiving points representative of at least a portion of a surface of a multi-dimensional geobody; partitioning the points; computing smooth compactly supported basis functions based at least in part on differential surface areas associated with the partitioning of the points; approximating an indicator function for a body based at least in part on the computed basis functions; and, based at least in part on values of the approximated indicator function, generating a mesh that represents a surface of the body.

17 Claims, 9 Drawing Sheets

(51) Int. Cl.
  *G06T 17/20* (2006.01)
  *G01V 1/34* (2006.01)
  *G01V 99/00* (2009.01)
(52) U.S. Cl.
  CPC ............ *G06T 17/005* (2013.01); *G06T 17/20* (2013.01); *G01V 2210/64* (2013.01)
(58) Field of Classification Search
  CPC ........ G01V 1/306; G01V 1/325; G06T 17/05; G06T 17/20; G06T 17/005; G06T 2219/2021; G06T 17/30; G06T 15/08; G06T 17/00; G06T 17/205; G06T 2200/04; G06T 2207/20161; G06F 17/5009; G06F 17/5018
  See application file for complete search history.

(56) References Cited

U.S. PATENT DOCUMENTS

| | | |
|---|---|---|
| 2008/0129731 A1 | 6/2008 | Spicer et al. |
| 2009/0033658 A1 | 2/2009 | Rockwood et al. |
| 2011/0087350 A1* | 4/2011 | Fogel ............... G06F 17/50 700/98 |
| 2011/0115787 A1* | 5/2011 | Kadlec ............... G01V 1/345 345/419 |

OTHER PUBLICATIONS

Bolitho, Matthew, et al. "Multilevel streaming for out-of-core surface reconstruction." Symposium on geometry processing. 2007.*
Frank, Tobias, Anne-Laure Tertois, and Jean-Laurent Mallet. "3D-reconstruction of complex geological interfaces from irregularly distributed and noisy point data." Computers & Geosciences 33.7 932-943. 2007.*
Zhou, Kun, et al. "Data-parallel octrees for surface reconstruction." IEEE Transactions on Visualization and Computer Graphics 17.5 (2011): 669-681. (Year: 2011).*
Carr, "Surface Interpolation with Radial Basis Function for Medical Imaging," IEEE Transactions on Medical Imaging, vol. 16, No. 1, Feb. 1997, pp. 96-107.
Carr, et al. "Reconstruction and representation of 3D objects with radial basis functions," ACM SIGGRAP, Los Angeles, CA, 2001, pp. 67-76.
Ekoule, et al., "A Triangulation Algorithm from Arbitrary Shaped Multiple Planar Contours," ACM Transactions on Graphics, vol. 10, No. 2, 1991, pp. 182-199.
Gousie et al., "Converting Elevation Contours to a Grid," Proc. 8th Int'l Symp. Spatial Data Handling, Int'l Geographic Union, 1998, pp. 1-10.
Keppel, "Approximating Complex Surface by Triangulation of Contour Lines" IBM Journal of Research and Development, vol. 19, Issue 1, Jan. 1975, pp. 2-11.
Lattuada et al., "Modelling of Salt Domes from Scattered Non-Regular Point Sets" Physics and Chemistry of the Earth, vol. 23, No. 3, 1998, pp. 273-277.
Lodha et al., "Scattered Data Techniques for Surfaces" H. Hagen, G.M. Nielson, and F. Post, eds., Proc. Dagstuhl Conf. Scientific Visualization, IEEE CS Press, 1999, pp. 182-223.
Manson, et al., "Streaming Surface Reconstruction Using Wavelets" Eurographics Symposium on Geometry Processing 2008, vol. 27, No. 5, 2008.
Meyers et al., "Surfaces from Contours" ACM Transactions on Graphics, vol. 11, No. 3, 1992, pp. 228-258.
Ohtake et al., "Multi-Level Partition of Unit Implicits," Proc. ACM Siggraph 2003, ACM Press, 2003, pp. 463-470.
Pouderoux, et al., "Adaptive Hierarchical RBF Interpolation for Creating Smooth Digital Elevation Models," Proc. 12th ACM Int'l Symp. Advances in Geographical Information Systems 2004, ACM Press, 2004, pp. 232-240.
Schumaker, "Fitting Surfaces to Scattered Data" G.G. Lorentz, C.K. Chui, and L.L. Schumaker, eds., Approximation Theory II, Academic Press, 1976, pp. 203-268.
Sibson, "Chapter 2: A Brief Description of Natural Neighbor Interpolation" Interpreting Multivariate Data, V. Barnett, ed., John Wiley & Sons, 1981, pp. 21-36.
Soille, "Spatial Distributions from Contour Lines: An Efficient Methodology Based on Distance Transformation" J. Visual Comm. and Image Representation, vol. 2, No. 2, 1991, pp. 138-150.
Turk et al., "Shape Transformation Using Variational Implicit Functions," Proc. ACM Siggraph 99, ACM Press, 1999, pp. 335-342.
Wendland, "Fast Evaluation of Radial Basis Functions: Methods Based on Partition of Unity," Approximation Theory X: Abstract and Classical Analysis, Vanderbilt Univ. Press, 2002, pp. 473-483.
International Search Report and Written Opinion for the equivalent International patent application PCT/US2014/038021 dated Jan. 26, 2015.
International Preliminary Report on Patentability for the equivalent International patent application PCT/US2014/038021 dated Nov. 17, 2015.

* cited by examiner

Method 400

Interpretation with Normals 410

Octree and Wavelet 430

Mesh Output 470

Mesh Extraction 450

Dual of Octree 454

Marching Cubes 458

GEOBODY SURFACE RECONSTRUCTION

RELATED APPLICATIONS

This application claims the priority to and the benefit of FR Patent Application No. 1354364 (France), filed 15 May 2013, which is incorporated by reference herein.

BACKGROUND

Phenomena associated with a geologic environment (e.g., a subsurface region, whether below a ground surface, water surface, etc.) may be modeled using various equations (e.g., stress, fluid flow, thermal, phase, etc.). As an example, a numerical model of a geologic environment may find use for understanding various processes related to exploration and production of natural resources (e.g., assessing depositional history, estimating reserves in place, drilling wells, forecasting production, etc.).

SUMMARY

A method can include receiving points representative of at least a portion of a surface of a multi-dimensional geobody; partitioning the points; computing smooth compactly supported basis functions based at least in part on differential surface areas associated with the partitioning of the points; approximating an indicator function for a body based at least in part on the computed basis functions; and, based at least in part on values of the approximated indicator function, generating a mesh that represents a surface of the body. A system can include a processor; memory operatively coupled to the processor; and one or more modules that include processor-executable instructions stored in the memory to instruct the system to receive a point representative of at least a portion of a surface of a multi-dimensional geobody; associate the point with partitioned points; compute smooth compactly supported basis functions based at least in part on differential surface areas associated with the partitioning of the points; approximate an indicator function for a body based at least in part on the computed basis functions; and, based at least in part on values of the approximated indicator function, generate a mesh that represents a surface of the body. One or more computer-readable storage media can include computer-executable instructions to instruct a computer to: receive seismic data of a volume of a geologic environment that includes a geobody; render information to a display based at least in part on the seismic data; receive input to select a point associated with a surface of the geobody based at least in part on the information rendered to the display; generate a mesh based at least in part on the selected point; receive input to select another point associated with the surface of the geobody based at least in part on the information rendered to the display; and generate an updated mesh based at least in part on the selected points. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

Figure 1:
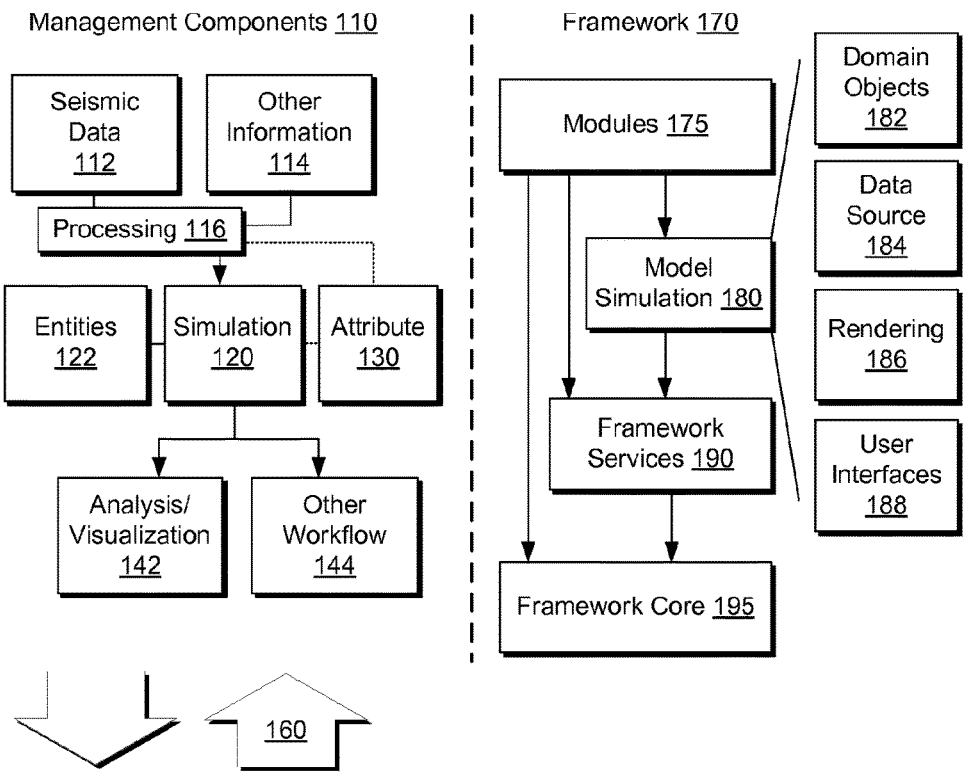
FIG. 1 illustrates an example system that includes various components for modeling a geologic environment and various equipment associated with the geologic environment.
Figure 1:
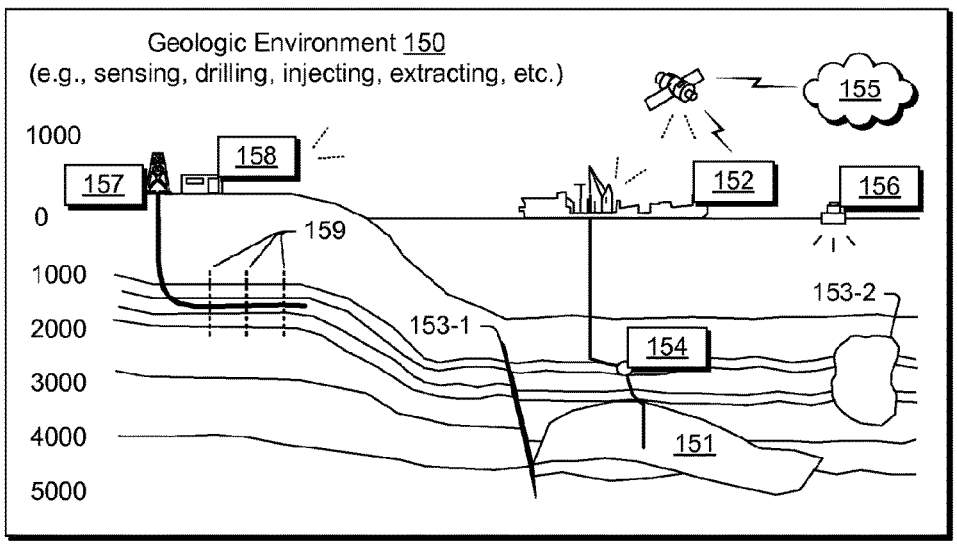

This description is not to be taken in a limiting sense, but rather is made merely for the purpose of describing the general principles of the implementations. The scope of the described implementations should be ascertained with reference to the issued claims.

Modeling of a geobody (e.g., a salt domes and other geobody) can involve construction of a multi-dimensional representation of the geobody from one or more sets of geophysical data. For example, an interpreter may visualize one or more sets of volumetric seismic data and select points that are believed to delineate a boundary (e.g., a surface) of a geobody. Once the interpreter has performed point selection for one or more sets of volumetric data, a system may receive the selected points and reconstruct a multi-dimensional representation of the geobody. In such a serial process, the interpreter may visualize the representation and then determine that more points will improve the representation, determine that certain points are in error, etc. Where further interpretation is desired, the interpreter returns to point selection, point editing, etc. and once again instructs the system to reconstruct a representation of the geobody. In the foregoing example, the interpreter receives feedback after completing a round of interpretation, editing, etc.

As an example, a method can include generating representations of at least a portion of a geobody during an interpretation process. For example, an interpretation process may provide points that may be assumed to be on a surface of a geobody (e.g., on the surface or close to being on the surface, etc.). In such an example, at least some other points may be considered to be not on the surface of the geobody of interest. As an example, a method may include determining orientations of individual points that are assumed to be on a surface, for example, as part of an interpretation process. A determined orientation may be, for example, an outwardly directed normal vector for an individual point with respect to an associated surface (e.g., of a geobody). As an example, a method may include generating a representation of at least a part of a geobody based at least in part on interpreted points and orientation information for such points.

As an example, a method may include generating a surface mesh of a body G at least in part by considering an indicator function $\chi_G$ where the body G has a surface boundary $\partial G$. For example, consider the following formulation of an indicator function:

$$\chi_G(x) = \begin{cases} 1, & x \in G \\ 0, & \text{elsewhere} \end{cases}$$

In such an example, if a particular x is a member of the body G (e.g., a subset of a larger set), then the indicator function for that particular x is unity; otherwise it is null. As an example, given such an indicator function, an approximation may be made thereof, $\tilde{\chi}_G$, for example, using individual points in space $p_i$ (e.g., where i=1 to N) and orientation information for those points with respect to the body G. For example, each point in space $p_i$ may include an outwardly directed normal vector $\vec{n}_i$ (e.g., "normal") with respect to the surface boundary $\partial G$ of the body G. Further, as mentioned, an assumption may be made that the particular points considered correspond to a surface of a geobody, for example, that they lie on, or close to, the surface boundary $\partial G$ of the body G (e.g., as may be determined by an interpreter selecting points via an interpretation process using a visual rendering of seismic data or processed seismic data).

In the example above, the indicator function (e.g., or characteristic function) is a function defined on a set that indicates membership in a subset of the set where, for example, a value of 1 may indicate membership and a value of 0 may indicate non-membership. In the foregoing example, the subset corresponds to the body while the set has more members than the subset (e.g., some in the subset and some not in the subset). Depending on formulation of equations, convention, etc., other values may be implemented. As an example, in a fuzzy approach, a membership function may be implemented (e.g., as a generalization of an indicator function in "classical" sets). As an example, a membership function can represent degree of truth as an extension of valuation where fuzzy truth represents membership in what may be vaguely defined sets. As an example, a membership function may be considered to be a type of indicator function.

As an example, an approximation of $\tilde{\chi}_G$ may be constructed by approximating wavelet coefficients of the indicator function $\chi_G$. In such an example, a surface boundary $\partial \tilde{G}$ of a level-set $\tilde{G}$ of $\tilde{\chi}_G$ may be considered to be an approximation of the surface boundary $\partial G$ of the body G (e.g., the surface of a geobody, etc.). As an example, where samples (e.g., points, etc.) are assumed to be on a surface boundary, such an approach may proceed optionally without one or more samples known and/or assumed to be from an interior and/or an exterior of the body. In other words, samples (e.g., points, etc.) assumed to be on a surface boundary of a body may be used in a wavelet-based approach to construct an approximation to an unknown indicator function associated with the body. As an example, an approach may include processing of non-uniformly sampled points (e.g., optionally in conjunction with uniformly sampled points).

As mentioned, a method may implement wavelets in generating a representation, for example, to construct $\tilde{\chi}_G$ by approximating wavelet coefficients of the indicator function $\chi_G$ (e.g., by estimating the wavelet coefficients via computations). As to the type of wavelet implemented, wavelets of the type that can provide a localized, multi-resolution representation of functions may be chosen (e.g., those with localized, compact support). As an example, the Haar wavelet may be implemented, which may be defined by a wavelet function and a scaling function:

$$\Psi(t) = \begin{cases} 1, & 0 \le t < 1/2 \\ -1, & 1/2 \le t < 1 \end{cases}$$

$$\varphi(t) = \begin{cases} 1, & 0 \le t < 1 \\ 0, & \text{elsewhere} \end{cases}$$

Per the foregoing functions, Haar wavelets may be viewed as a sequence of rescaled "square-shaped" functions that may collectively form a wavelet family or basis. The foregoing functions may be considered to be a wavelet function for a "mother" wavelet and a scaling function for a "father" wavelet that can be used to define a "family" of functions, for example, to approximate another function. While the Haar wavelet may be considered to be a discontinuous wavelet, Haar wavelets can be used to approximate continuous functions. As an example, Haar wavelets may be implemented in one or more dimensions. A Haar basis includes functions known as basis functions where such functions together with Haar coefficients may be used to represent (e.g., approximate) a function. As an example, a square integrable function, whose integral is finite, may be expressed as a linear combination of a certain number of basis functions.

As an example, consider a function $f(x)$ represented by Haar basis functions $h_{jk}(x)$ and Haar coefficients $d_{jk}$:

$$f(x) = \sum_{j,k} \langle f, h_{jk} \rangle h_{jk}(x) = \sum_{j,k} d_{jk} \cdot h_{jk}(x)$$

where $h_{jk} = 2^{j/2} \cdot h(2^j x - k)$, for $j,k \in Z$ and $x \in [0,1]$; noting that the scaling function may be written as:

$$\varphi_{jk}(x) = 2^{\frac{j}{2}} \varphi(2^j x - k),$$

which can scale the function $f(x)$ over a given interval (e.g., an allow for consideration of the "average" of the function over that interval). As an example, a Haar wavelet approach can approximate a function based on a number of sampled points that may be considered to be representative of the function (e.g., without knowing the function a priori).

Referring again to an example involving the body G with the surface boundary $\partial G$ and involving the indicator function $\chi_G$, through application of the divergence theorem, a differential surface area, $d\sigma$, for the surface boundary $\partial G$ of the body G may be defined; noting that the divergence theorem is a case of Stokes' theorem, which holds that the integral of a differential form $\omega$ over the boundary of some orientable manifold $\Omega$ can be equated to the integral of its exterior derivative $d\omega$ over the whole of $\Omega$. As an example, computation of coefficients (e.g., for a wavelet representation that approximates the indicator function $\chi_G$) can include determining values for differential surface areas $d\sigma_i$ for individual points $p_i$ (e.g., points that may be assumed to be on the surface boundary $\partial G$ of the body G).

As an example, a method may include implementing an octree-based technique to estimate $d\sigma_i$ (e.g., which may handle lack of uniformity of points). In such an example, the method may refine octree cells that include points until a specified maximum depth is reached (e.g., dmax). In such a method, upon insertion of points into the octree, pruning of leaves may occur, for example, until individual leaves are adjacent to at least 3 octree cells (e.g., of the same depth)

that include points. In such an example, the criteria of 3 adjacent cells may act to guarantee a minimum number of cells to form a connected piece of surface (e.g., consider a tetrahedron as a volume defined by four surfaces). In such an example, a value of $d\sigma_i$, associated with a point $p_i$ inside a leaf from an octree may be given by:

$$d\sigma_i = \frac{2^{-2d_i}}{m}$$

where m is a total number of points in the leaf and $d_i$ is the depth of the leaf. The quantity is the area of the side of the leaf divided by the number of points in that leaf. The computation of $d\sigma_i$ creates an octree in which whose cells are associated with the wavelet coefficients (e.g., as indexed by individual cells).

As mentioned, a body G with a surface boundary $\partial G$ may be defined using an indicator function $\chi_G$ where that indicator function $\chi_G$ may be approximated as $\tilde{\chi}_G$ through use of wavelets, in particular, by determining wavelet coefficients. Thus, an octree, as explained above, may include information sufficient to compute an approximate indicator function as to an actual indicator function. In such an example, an approximate body $\tilde{G}$ as to an actual body G may be recovered from the approximate indicator function $\tilde{\chi}_G$, for example, a result may be $\partial \tilde{G}$ of a level-set $\tilde{G}$ of $\tilde{\chi}_G$. In such an example, where G is a geobody and sample points are provided that are assumed to be on the surface boundary $\partial G$ of that geobody G, via a wavelet-based approach, the result $\partial \tilde{G}$ may be an approximation of the surface boundary of that geobody.

As an example, a method can include receiving points representative of at least a portion of a surface of a multi-dimensional geobody; partitioning the points; computing smooth compactly supported basis functions based at least in part on differential surface areas associated with the partitioning of the points; and approximating an indicator function for a body based at least in part on the computed basis functions. In such an example, the surface boundary of the body may be determined and, for example, a mesh may be generated that represents at least a portion of the surface boundary of the body. In such an example, as the points (e.g., samples) may be associated with an actual, physical geobody, the surface boundary may represent the surface boundary of that actual, physical geobody. For example, a method may include receiving points associated with a geobody, approximating an indicator function for a body based at least in part on at least a portion of the points (e.g., a mathematically defined body) and, based at least in part on values of the approximated indicator function, generating a mesh that represents a surface of the body where the surface may represent a surface of the geobody.

As mentioned, an indicator function may be defined to have values of 1 inside a body and values of 0 elsewhere. As an example, to extract a surface, a value such as an iso-value may be selected (e.g., consider 0.5, a data-dependent iso-value as an average value of $\tilde{\chi}_G$, etc.).

The ability of wavelets to detect discontinuities can create an adaptive refinement of an octree near a boundary of a body. As an example, an octree may be used to construct a polygonal model of an approximate boundary of a body by applying an octree contouring technique. Such a technique can include computing a dual cell structure of the octree through a recursive octree walk. Such a technique can include using values of $\tilde{\chi}_G$ at vertices of the dual cells (e.g., located at centers of the corresponding octree cells). As an example, a marching cubes technique may be implemented on the dual cells to create a contour (e.g., a water-tight, adaptive contour). Such a contour may be a topological and geometrical manifold. In such an example, as the number of dual cells tends to be proportional to the size of the octree, computational run time of this contouring technique tends to be proportional to the size of the octree.

As an example, a method may include smoothing of an approximate indicator function. As to wavelet support (e.g., domains), smaller support can possibly negatively impact quality of a resulting surface. Thus, rather than increasing the support of the wavelet to improve quality of a reconstructed surface, post-processing may be performed for smoothing of an approximate indicator function.

As an example, a method may include implementing wavelets and may include implementing a space partitioning algorithm, for example, for reconstructing an indicator function of a shape from a set of a geophysical datasets (e.g., from a set of oriented randomly shaped seismic interpretation lines from random planes). As an example, a method may include implementing an iso-extraction algorithm, for example, to generate a multi-dimensional mesh (e.g., a mesh-based model of a body).

As an example, a method may include generating a mesh that represents a body such as a geobody (e.g., consider a mesh that represents a surface boundary of a geobody). In such an example, the body may be closed. As an example, a body may be homeomorphic to a sphere, etc. As an example, a method may include generating multiple meshes where each mesh represents one of a plurality of bodies (e.g., surface boundaries thereof).

FIG. 1 shows an example of a system 100 that includes various management components 110 to manage various aspects of a geologic environment 150 (e.g., an environment that includes a sedimentary basin, a reservoir 151, one or more fractures 153, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET™ framework (Redmond, Wash.), which provides a set of extensible object classes. In the .NET™ framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Tex.), the INTERSECT™ reservoir simulator (Schlumberger Limited, Houston Tex.), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Tex.) allows for integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, etc. Such a framework may include a mesh generation component that processes input information, optionally in conjunction with other information, to generate a mesh. As an example, where the input component receives information associated with a geobody or geobodies, the mesh generation component may process such information to generate one or more meshes (e.g., a mesh per geobody, etc.).

As an example, a mesh generation component may operate during an interpretation process, for example, mesh generation may occur in response to receipt of information from interpretation of seismic data. In such an example, a computing device may receive a user selected point that is believed to be on a surface of a geobody, the computing device may input that point to a mesh generation component and the computing device may generate and render a mesh to a display where the mesh provides visual feedback to the user as to selection of additional points, modification of that point, etc.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as a fault 153-1, a geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.). As an example, a plug-in may include instructions for mesh generation, for example, using a wavelet-based approach.

Figure 2:
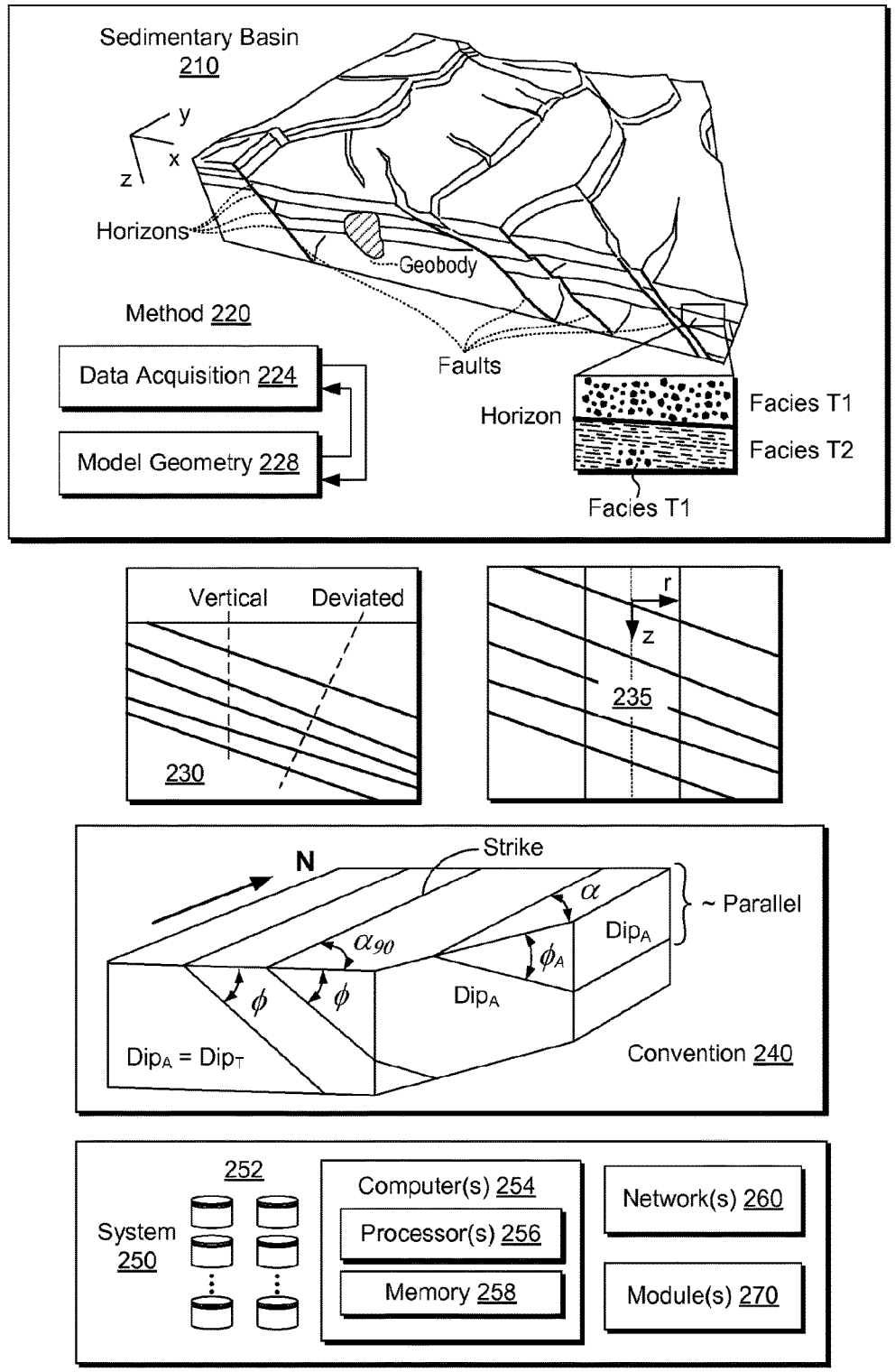
FIG. 2 illustrates an example of a sedimentary basin, an example of a method, an example of a formation, an example of a borehole, an example of a convention and an example of a system.

FIG. 2 shows an example of a sedimentary basin 210 (e.g., a geologic environment), an example of a method 220 for model building (e.g., for a simulator, etc.), an example of a formation 230, an example of a borehole 235 in a formation, an example of a convention 240 and an example of a system 250.

As an example, reservoir simulation, petroleum systems modeling, etc. may be applied to characterize various types of subsurface environments, including environments such as those of FIG. 1.

In FIG. 2, the sedimentary basin 210, which is a geologic environment, includes horizons, faults, one or more geobodies and facies formed over some period of geologic time. These features are distributed in two or three dimensions in space, for example, with respect to a Cartesian coordinate system (e.g., x, y and z) or other coordinate system (e.g., cylindrical, spherical, etc.). As shown, the model building method 220 includes a data acquisition block 224 and a model geometry block 228. Some data may be involved in building an initial model and, thereafter, the model may optionally be updated in response to model output, changes in time, physical phenomena, additional data, etc. As an example, data for modeling may include one or more of the following: depth or thickness maps and fault geometries and timing from seismic, remote-sensing, electromagnetic, gravity, outcrop and well log data. Furthermore, data may include depth and thickness maps stemming from facies variations (e.g., due to seismic unconformities) assumed to follow geological events ("iso" times) and data may include lateral facies variations (e.g., due to lateral variation in sedimentation characteristics).

To proceed to modeling of geological processes, data may be provided, for example, data such as geochemical data (e.g., temperature, kerogen type, organic richness, etc.), timing data (e.g., from paleontology, radiometric dating, magnetic reversals, rock and fluid properties, etc.) and boundary condition data (e.g., heat-flow history, surface temperature, paleowater depth, etc.).

In basin and petroleum systems modeling, quantities such as temperature, pressure and porosity distributions within the sediments may be modeled, for example, by solving partial differential equations (PDEs) using one or more numerical techniques. Modeling may also model geometry with respect to time, for example, to account for changes stemming from geological events (e.g., deposition of material, erosion of material, shifting of material, etc.).

A commercially available modeling framework marketed as the PETROMOD® framework (Schlumberger Limited, Houston, Tex.) includes features for input of various types of information (e.g., seismic, well, geological, etc.) to model evolution of a sedimentary basin. The PETROMOD® framework provides for petroleum systems modeling via input of various data such as seismic data, well data and other geological data, for example, to model evolution of a sedimentary basin. The PETROMOD® framework may predict if, and how, a reservoir has been charged with hydrocarbons, including, for example, the source and timing of hydrocarbon generation, migration routes, quantities, pore pressure and hydrocarbon type in the subsurface or at surface conditions. In combination with a framework such as the PETREL® framework, workflows may be constructed to provide basin-to-prospect scale exploration solutions. Data exchange between frameworks can facilitate construction of models, analysis of data (e.g., PETROMOD® framework data analyzed using PETREL® framework capabilities), and coupling of workflows.

As shown in FIG. 2, the formation 230 includes a horizontal surface and various subsurface layers. As an example, a borehole may be vertical. As another example, a borehole may be deviated. In the example of FIG. 2, the borehole 235 may be considered a vertical borehole, for example, where the z-axis extends downwardly normal to the horizontal surface of the formation 230.

As to the convention 240 for dip, as shown, the three dimensional orientation of a plane can be defined by its dip and strike. Dip is the angle of slope of a plane from a horizontal plane (e.g., an imaginary plane) measured in a vertical plane in a specific direction. Dip may be defined by magnitude (e.g., also known as angle or amount) and azimuth (e.g., also known as direction). As shown in the convention 240 of FIG. 2, various angles $\phi$ indicate angle of slope downwards, for example, from an imaginary horizontal plane (e.g., flat upper surface); whereas, dip refers to the direction towards which a dipping plane slopes (e.g., which may be given with respect to degrees, compass directions, etc.). Another feature shown in the convention of FIG. 2 is strike, which is the orientation of the line created by the intersection of a dipping plane and a horizontal plane (e.g., consider the flat upper surface as being an imaginary horizontal plane).

Some additional terms related to dip and strike may apply to an analysis, for example, depending on circumstances, orientation of collected data, etc. One term is "true dip" (see, e.g., $Dip_T$ in the convention 240 of FIG. 2). True dip is the dip of a plane measured directly perpendicular to strike (see, e.g., line directed northwardly and labeled "strike" and angle $\alpha_{90}$) and also the maximum possible value of dip magnitude. Another term is "apparent dip" (see, e.g., $Dip_A$ in the convention 240 of FIG. 2). Apparent dip may be the dip of a plane as measured in any other direction except in the direction of true dip (see, e.g., $\phi_A$ as $Dip_A$ for angle $\alpha$); however, it is possible that the apparent dip is equal to the true dip (see, e.g., $\phi$ as $Dip_A$=$Dip_T$ for angle $\alpha_{90}$ with respect to the strike). In other words, where the term apparent dip is used (e.g., in a method, analysis, algorithm, etc.), for a particular dipping plane, a value for "apparent dip" may be equivalent to the true dip of that particular dipping plane.

As shown in the convention 240 of FIG. 2, the dip of a plane as seen in a cross-section perpendicular to the strike is true dip (see, e.g., the surface with $\phi$ as $Dip_A$=$Dip_T$ for angle $\alpha_{90}$ with respect to the strike). As indicated, dip observed in a cross-section in any other direction is apparent dip (see, e.g., surfaces labeled $Dip_A$). Further, as shown in the convention 240 of FIG. 2, apparent dip may be approximately 0 degrees (e.g., parallel to a horizontal surface where an edge of a cutting plane runs along a strike direction).

In terms of observing dip in wellbores, true dip is observed in wells drilled vertically. In wells drilled in any other orientation (or deviation), the dips observed are apparent dips (e.g., which are referred to by some as relative dips). In order to determine true dip values for planes observed in such boreholes, as an example, a vector computation (e.g., based on the borehole deviation) may be applied to one or more apparent dip values.

As mentioned, another term that finds use in sedimentological interpretations from borehole images is "relative dip" (e.g., $Dip_R$). A value of true dip measured from borehole images in rocks deposited in very calm environments may be subtracted (e.g., using vector-subtraction) from dips in a sand body. In such an example, the resulting dips are called relative dips and may find use in interpreting sand body orientation.

A convention such as the convention 240 may be used with respect to an analysis, an interpretation, an attribute, etc. (see, e.g., various blocks of the system 100 of FIG. 1). As an example, various types of features may be described, in part, by dip (e.g., sedimentary bedding, faults and fractures, cuestas, igneous dikes and sills, metamorphic foliation, etc.). As an example, dip may change spatially as a layer approaches a geobody. For example, consider a salt body that may rise due to various forces (e.g., buoyancy, etc.). In such an example, dip may trend upward as a salt body moves upward.

Seismic interpretation may aim to identify and/or classify one or more subsurface boundaries based at least in part on one or more dip parameters (e.g., angle or magnitude, azimuth, etc.). As an example, various types of features (e.g., sedimentary bedding, faults and fractures, cuestas, igneous dikes and sills, metamorphic foliation, etc.) may be described at least in part by angle, at least in part by azimuth, etc.

As an example, equations may be provided for petroleum expulsion and migration, which may be modeled and simulated, for example, with respect to a period of time. Petroleum migration from a source material (e.g., primary migration or expulsion) may include use of a saturation model where migration-saturation values control expulsion. Determinations as to secondary migration of petroleum (e.g., oil or gas), may include using hydrodynamic potential of fluid and accounting for driving forces that promote fluid flow. Such forces can include buoyancy gradient, pore pressure gradient, and capillary pressure gradient.

As shown in FIG. 2, the system 250 includes one or more information storage devices 252, one or more computers 254, one or more networks 260 and one or more modules 270. As to the one or more computers 254, each computer may include one or more processors (e.g., or processing cores) 256 and memory 258 for storing instructions (e.g., modules), for example, executable by at least one of the one or more processors. As an example, a computer may include one or more network interfaces (e.g., wired or wireless), one or more graphics cards, a display interface (e.g., wired or wireless), etc. As an example, imagery such as surface imagery (e.g., satellite, geological, geophysical, etc.) may be stored, processed, communicated, etc. As an example, data may include SAR data, GPS data, etc. and may be stored, for example, in one or more of the storage devices 252.

As an example, the one or more modules 270 may include instructions (e.g., stored in memory) executable by one or more processors to instruct the system 250 to perform various actions. As an example, the system 250 may be configured such that the one or more modules 270 provide for establishing the framework 170 of FIG. 1 or a portion thereof. As an example, one or more methods, techniques, etc. may be performed using one or more modules, which may be, for example, one or more of the one or more modules 270 of FIG. 2.

Figure 3:
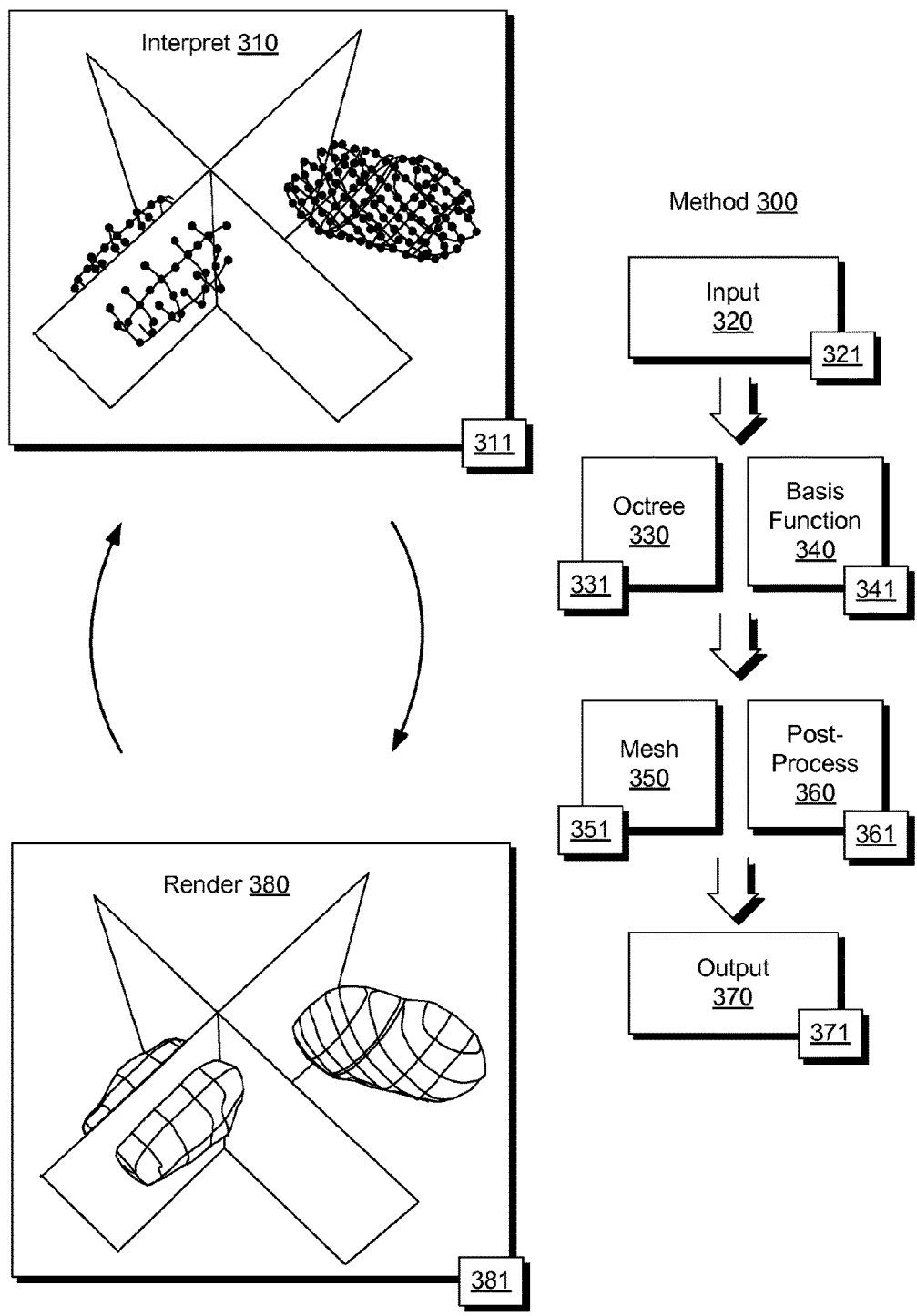
FIG. 3 illustrates an example of a method.

FIG. 3 shows an example of a method 300 that is illustrated along with an interpretation block 310 for interpretation of data and a render block 380 for rendering of information such as, for example, information based on a generated mesh. As shown in FIG. 3, the method 300 includes an input block 320 for receiving information, an octree block 330 for forming one or more octrees, a basis function block 340 for formulating one or more basis functions (e.g., using a type of wavelet, etc.), a mesh block 350 for generating a mesh, a post-process block 360 for post-mesh processing (e.g., for smoothing a mesh) and an output block 370 for outputting a generated and optionally smoothed mesh. As an example, the output block 370 may output information for a mesh where graphics circuitry may render a visualization of the mesh based at least in part on such information.

In the example of FIG. 3, a system may include a display and an input mechanism where the system may render visualizations based at least in part on seismic data to the display and where the system may receive input for selection of one or more points, for example, by a user controlling the input mechanism (e.g., a touch-screen, a stylus, a mouse, a trackball, a voice command cursor, etc.). In such an example, the points may be defined in a multi-dimensional space, for example, with respect to a Cartesian coordinate system (e.g., x, y and z).

As an example, a system may be configured to implement the method 300, for example, such that the output block 370 outputs information responsive to the input block 320 receiving information. In such an example, the system may render visualizations to the display that guide a user in selection of points. For example, the system may update a rendering of a geobody responsive to receipt of points that are believed to represent a surface of the geobody. In such a manner, a user may visualize at least a portion of a geobody during interpretation, for example, to guide interpretation (e.g., selection one or more additional points, edit one or more points, etc.).

The method 300 is shown in FIG. 3 in association with various computer-readable media (CRM) blocks 311, 321, 331, 341, 351, 361, 371 and 381. Such blocks generally include instructions suitable for execution by one or more processors (or cores) to instruct a computing device or system to perform one or more actions. While various blocks are shown, a single medium may be configured with instructions to allow for, at least in part, performance of various actions of the method 300, etc. As an example, a computer-readable medium (CRM) may be a computer-readable storage medium. As an example, the blocks 311, 321, 331, 341, 351, 361, 371 and 381 may be provided as one or more modules, for example, such as the one or more modules 270 of the system 250 of FIG. 2.

Figure 4:
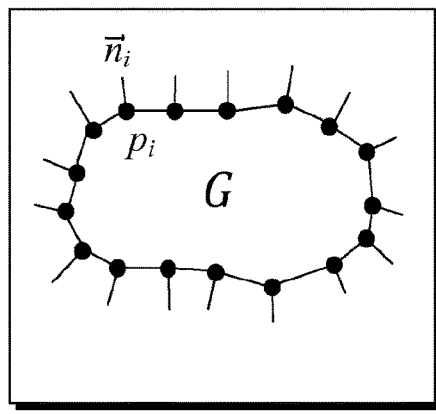
FIG. 4 illustrates an example of a method.
Figure 4:
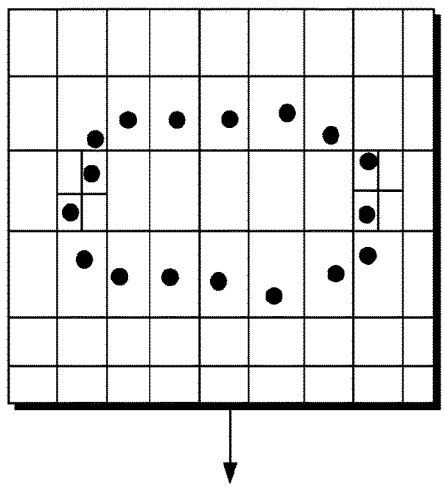
Figure 4:
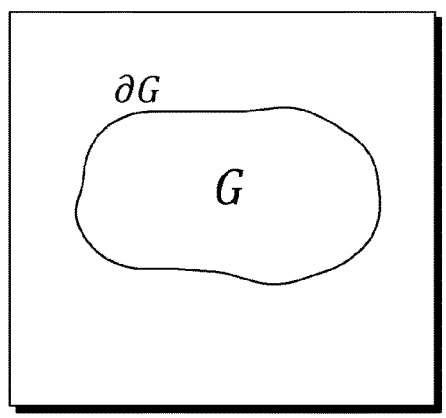

FIG. 4 shows an example of a method 400 that includes an interpretation block 410, an octree and wavelet block 430, a mesh extraction block 450 and a mesh output block 470. The example of FIG. 4 is illustrated in two dimensions noting that the body G and octree cells may be three-dimensional, for example, to provide a three-dimensional surface ∂G.

As indicated in FIG. 4, points and associated normals (e.g., orientation information) may be provided as input to an algorithm that implements an octree-based technique to estimate differential surface areas and wavelet coefficients to approximate an indicator function. In such an example, the normals may be computed and/or interpreted. For example, a user may indicate a normal of a point during interpretation (e.g., by selecting a point and making a motion outward from a perceived surface), an interpretation algorithm may estimate a normal for a selected point during interpretation (e.g., based on a trend in selected points, etc.), etc.

As an example, points and associated normals may be from disparate sets of data (e.g., disparate in space, disparate in time, disparate in acquisition technique, etc.). As an example, a user may select planes through a data set (e.g., volumetric data) that are believed to at least partially intersect a body or bodies.

As to the octree and wavelet block 430, an octree-based technique may be applied to partition points, for example, into cells. In such an example, each cell may define an area with respect to a surface, for example, such that a differential surface area may be computed for individual points. As an example, coefficients of wavelets may be computed based at least in part on values of differential surface areas for individual points.

As to the mesh extraction block 450, as shown in a block 454, a dual of an octree may be computed, which may be part of an octree-based contouring technique. As shown in a block 458, a marching cubes algorithm may be applied to the dual cells to create a water-tight, adaptive contour. In such an example, the contour may be a topological and geometrical manifold. As an example, the contour may be a polygonal mesh that may be output per the mesh output block 470.

As an example, a user may complete a round of interpretation and then select an option to generate a mesh based at least in part on that round of interpretation. For example, a user may perform a workflow that includes an interpretation session where the user manipulates an input mechanism of a computing system to select various points in space while visualizing data (e.g., seismic data, one or more attributes, etc.). Upon completion of the interpretation session, the user may select an option for mesh generation. For example, upon completion of the interpretation session, a graphical user interface may include an option for mesh generation, which may include rendering a representation of a body to a display (e.g., based at least in part on a generated mesh). Upon inspection of a rendering, a user may determine that further interpretation, editing, etc. may improve the accuracy of the generated mesh.

As an example, one or more portions of a workflow may be performed by one or more users. For example, a workflow may be performed by multiple individuals. Consider two or more users interpreting data associated with a volume of a geologic environment where upon receipt of information (e.g., points, etc.) from one or more of the users, a computing system generates a mesh and renders a representation thereof to a display or to displays. Such an approach may expedite a workflow, for example, by allowing different users to interpret with feedback based on multi-user interpretation, optionally in real-time (e.g., where a generation and rendering of a mesh that represents a surface of a body may be achieved on the order of seconds).

Figure 5:
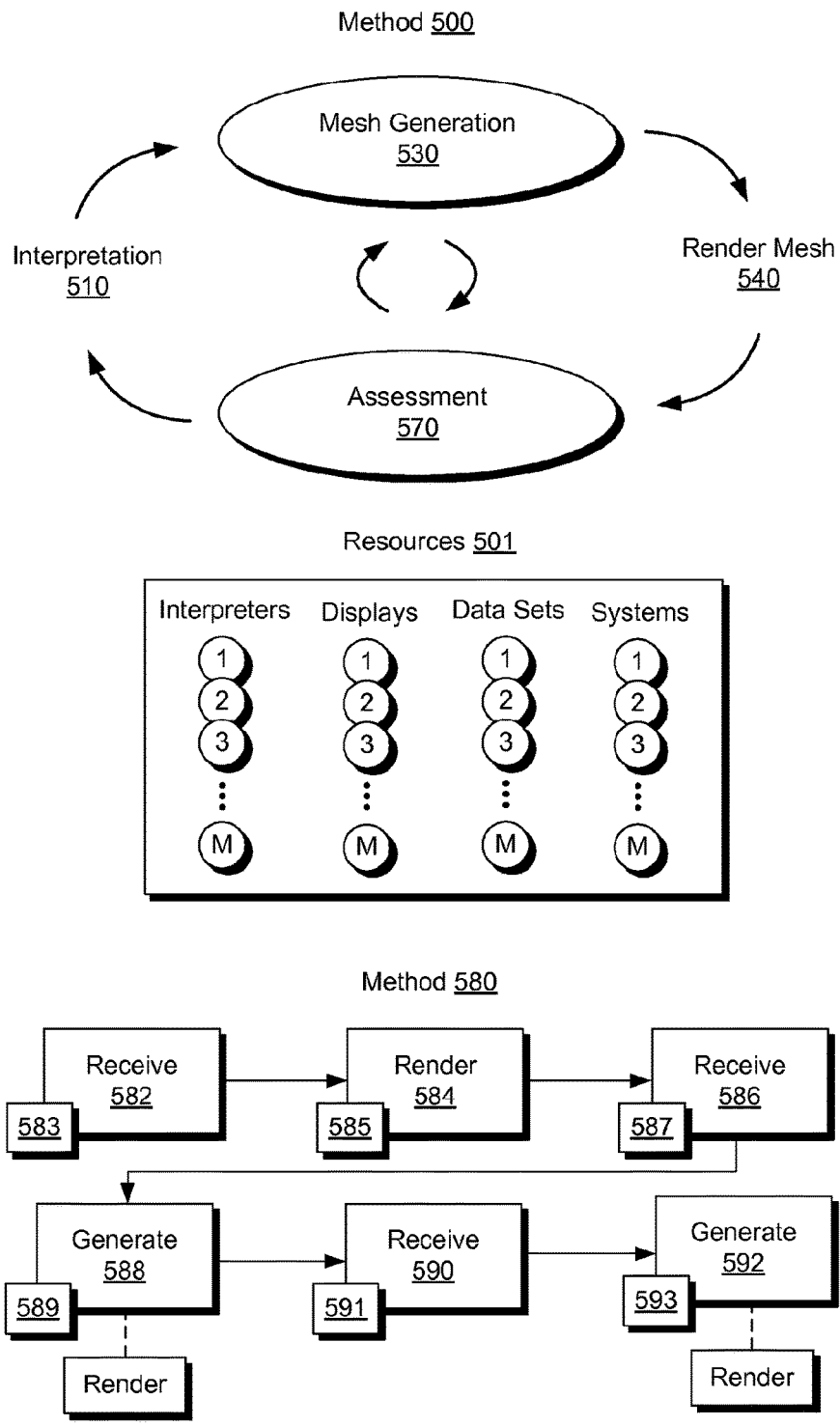
FIG. 5 illustrates an example of a method, an example of resources and an example of another method.

FIG. 5 shows an example of a method 500 that may be performed using one or more configurations of equipment (see, e.g., resources 501). In such an example, the method may include receiving input via one or more input mechanisms, for example, as controlled by one or more users.

As shown in the example of FIG. 5, the method includes interpretation 510 that can generate information (e.g., points, etc.), mesh generation 530 that can generate a mesh, rendering 540 that can render a representation or representations of a generated mesh, assessment 570 that can assess a generated mesh or generated meshes.

As an example, an assessment may be a quality control assessment that determines whether a generated mesh is suitable for modeling, resource-related decision making, etc. As an example, based on assessment 570 of one or more generated meshes, the method 500 may include further interpretation 510.

As indicated in FIG. 5, the method 500 may be implemented using one or more interpreters, one or more displays, one or more data sets, one or more systems, etc. (see, e.g., the resources 501).

FIG. 5 also shows an example of a method 580 that includes a reception block 582 for receiving seismic data of a volume of a geologic environment that includes a geobody; a render block 584 for rendering information to a display based at least in part on the seismic data; a reception block 586 for receiving input to select a point associated with a surface of the geobody based at least in part on the information rendered to the display; a generation block 588 for generating a mesh based at least in part on the selected point and an approximation of an indicator function; a reception block 590 for receiving input to select another point associated with the surface of the geobody based at least in part on the information rendered to the display; and a generation block 592 for generating an updated mesh based at least in part on the selected points and a re-approximation of the indicator function. Such a method may optionally be performed via input received from one or more pieces of equipment (e.g., optionally from one or more interpreters).

As an example, where a mesh is generated, a method may include rendering a representation of at least a portion of the mesh, for example, to one or more displays, to one or more output devices, etc. In such an example, one or more assessments may be made based on a rendered representation of at least a portion of the mesh. As illustrated with respect to the method 500, an assessment may lead to further interpretation, input, reception, etc.

As an example, a method may be implemented in near real-time, for example, depending on resources, number of points, etc., mesh generation via an indicator function-based approach may be performed using a computer where a mesh is generated in a time of the order of seconds after receipt of input that selects a point (e.g., or that inputs points). As an example, in a trial, a method performed mesh generation via an indicator function-based approach that implemented Haar wavelets for a formation with about two million associated points with mesh generation times of less than about 5 seconds. The trial generated meshes for the formation at different depths and demonstrated that processing time for such an approach would be acceptable for implementation in one or more workflows.

The method 580 is shown in FIG. 5 in association with various computer-readable media (CRM) blocks 583, 585, 587, 589, 591 and 593. Such blocks generally include instructions suitable for execution by one or more processors (or cores) to instruct a computing device or system to perform one or more actions. While various blocks are shown, a single medium may be configured with instructions to allow for, at least in part, performance of various actions of the method 580, etc. As an example, a computer-readable medium (CRM) may be a computer-readable storage medium. As an example, the blocks 583, 585, 587, 589, 591 and 593 may be provided as one or more modules, for example, such as the one or more modules 270 of the system 250 of FIG. 2.

Figure 6:
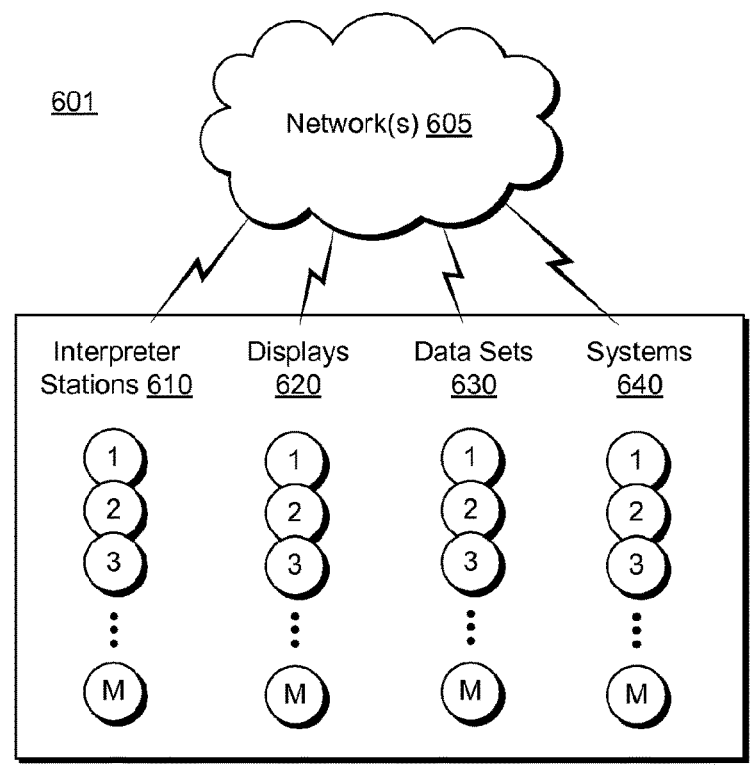
FIG. 6 illustrates examples of scenarios.
Figure 6:
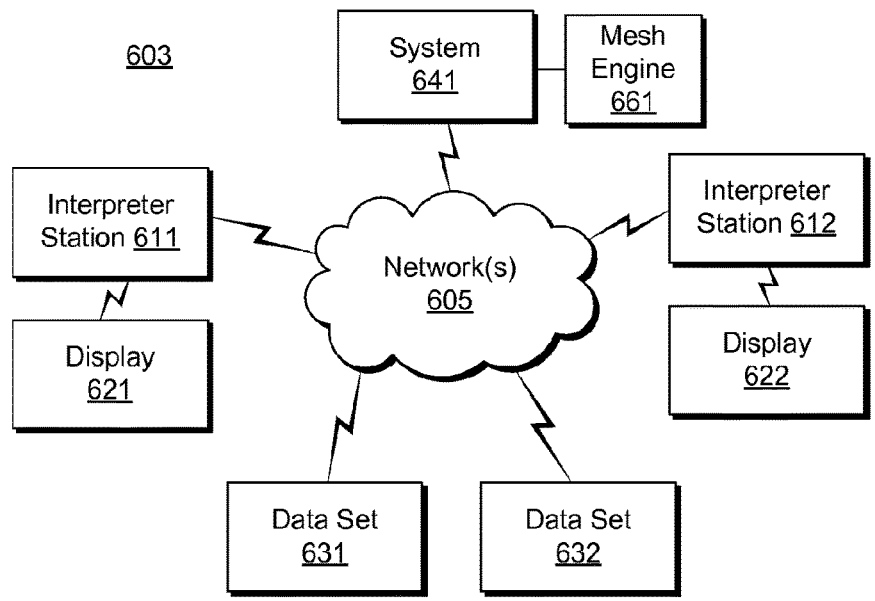

FIG. 6 shows an example of a scenario 601 that includes one or more networks 605 that may be operatively coupled to one or more interpreter stations 610, one or more displays 620, one or more data sets 630 and one or more systems 640.

FIG. 6 also shows an example of a scenario 603 where an interpreter station 611 with an associated display 621 and an interpreter station 612 with an associated display 622 are operatively coupled to a system 641 via one or more networks 605 and where the system 641 includes a mesh engine 661, for example, to generate one or more meshes based at least in part on information received from one or more of the interpreter stations 611 and 612. In the example scenario 603, one or more data sets 631 and 632 may be accessible via the one or more networks 605. For example, consider one or more network storage systems (e.g., storage area network (SAN), network attached storage (NAS), NAS-SAN, etc.) that store the one or more data sets 631 and 632. As an example, the data sets 631 and 632 may include seismic data, attributes based at least in part on seismic data, etc. As an example, a network storage device may include one or more generated meshes, for example, as generated by a mesh engine.

As an example, a mesh engine may be a plug-in or component of a framework. For example, a mesh engine may be operatively coupled to a seismic-to-simulation framework. As an example, a mesh engine may be provided at least in part as a geobody mesh modeling plug-in, for example, that can plug-in to a framework such as the PETREL® framework, the OCEAN® framework, etc. As an example, the mesh engine 661 of the scenario 603 of FIG. 6 may be configured as a module that includes processor-executable instructions (see, e.g., the modules 270 of the system 250 of FIG. 2).

As an example, an interpreter station may be a computer, a computing system, etc. that may include a wired and/or a wireless network interface. As an example, an interpreter station may include a display operatively coupled thereto (e.g., via wire or wirelessly) where the interpreter station may render information to the display and, for example, optionally receive information from the display (e.g., consider a finger touch-screen, a stylus enabled screen, etc.).

As an example, a method may include a mesh generation algorithm that that operates computationally in a manner proportional to depth of a space partitioning structure. Such an approach may expedite geobody modeling.

As an example, an input to a mesh generation method may include a set of oriented multi-z interpretation lines (e.g., multi-z interpretation lines and normal). Such a method may implement a wavelet-based technique where wavelets provide a localized, multi-resolution representation of functions for purposes of surface reconstruction.

As an example, a method may include implementing wavelet basis functions and a space partitioning algorithm to reconstruct an indicator function of a shape from a set of randomly shaped oriented multi-z interpretation lines picked on random planes (e.g., with properties such as seismic, EM, etc.).

As an example, a method may include options for refinement of partitioning resolution, selection of wavelet type, etc. For example, a graphical user interface may include one or more menus that include entries selectable via an input mechanism (e.g., a navigation tool). In such a manner, a mesh engine may be tailored for a particular task, workflow, data set, etc. As an example, a workflow may include automatically choosing a partitioning resolution and a suitable basis function with respect to qualitative flags (e.g., extracted from geophysical multi-z input).

As an example, a method may include implementing an iso-extraction algorithm, for example, to generate a multi-dimensional mesh model.

As an example, a mesh engine may include instructions to implement an implicit technique that includes wavelets (e.g., as multi-resolution structures) to reconstruct a geobody surface. Such wavelets may be localized and multi-resolution. As an example, an output mesh may be multi-resolution (e.g., varying from coarse to precise), which may facilitate one or more quality control procedures.

Figure 7:
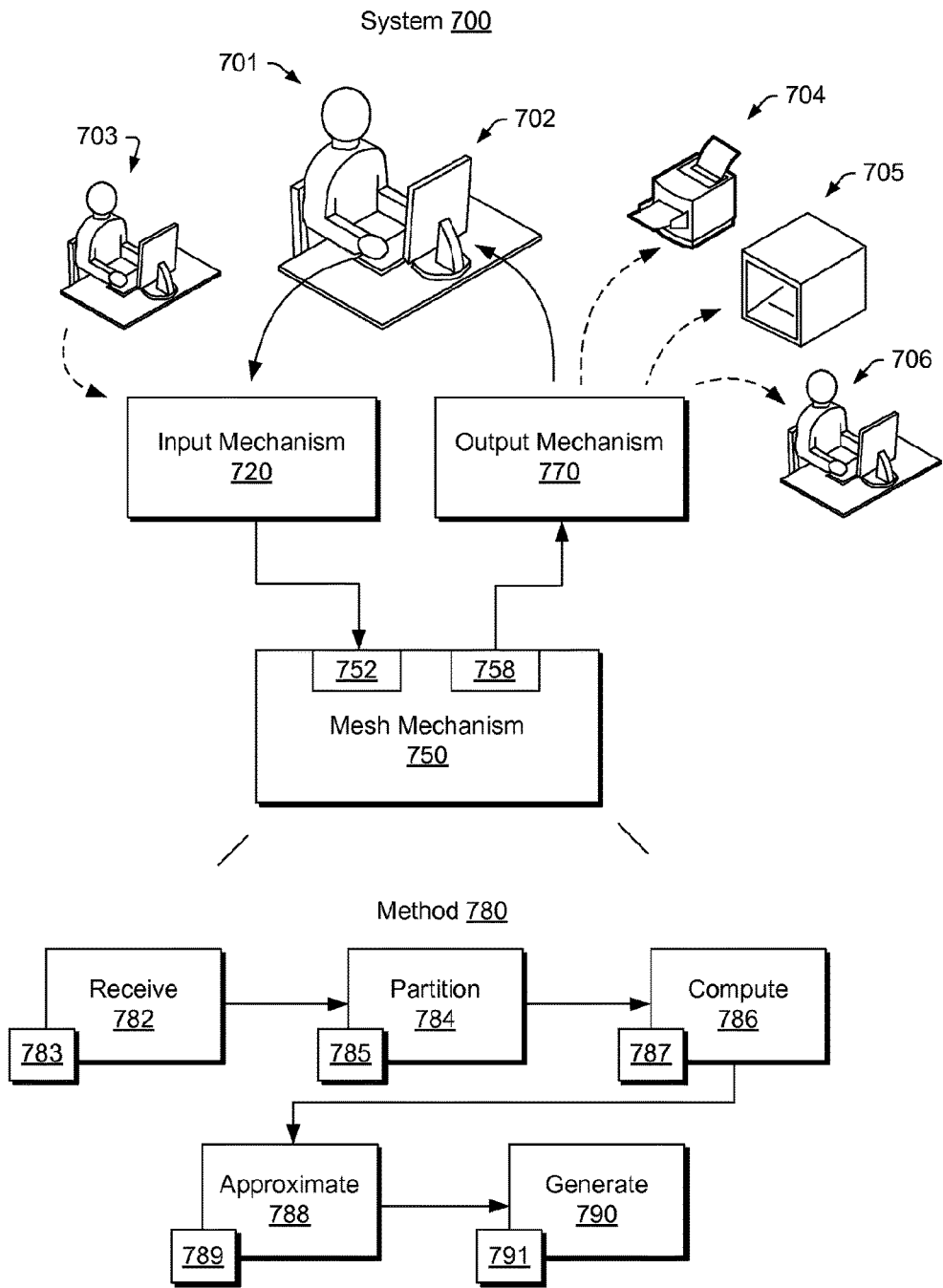
FIG. 7 illustrates an example of a system and an example of a method.

FIG. 7 shows an example of a system 700 and an example of a method 780. As shown the system 700 can include an input mechanism 720, a mesh mechanism 750 and an output mechanism 770. As an example, a user 701 may operate a machine 702 as an input mechanism where the machine 702 may be one of one or more output mechanism. As an example, a printer 704 may be an output mechanism, a 3D printer 705 may be an output mechanism, another machine 706 may be an output mechanism. As an example, the input mechanism 720 may be configured to operate responsive to multiple users such as the user 701 and another user 703.

As an example, the mesh mechanism 750 may implement a basis function-based approach, for example, where wavelets may be used. As an example, the mesh mechanism 750 may act to update one or more meshes responsive to input, for example, on a relatively real-time basis. In such an example, whatever input the mesh mechanism receives via an interface 752 may be used for meshing to generate mesh results that may be output via an interface 758. As an example, a method may include interpreting, generating a mesh, rendering the mesh, etc., for example, with interaction occurring at the interpretation level to drive the method. Such an approach may be implemented, for example, as a workflow in the oil and gas industry. For example, whatever a user draws (e.g., interprets, etc.) may be rendered as a mesh with minimal interaction (e.g., optionally up to several million of points or more).

As to the method 780, as shown in the example of FIG. 7, it may include a reception block 782 for receiving points representative of at least a portion of a surface of a multi-dimensional geobody; a partition block 784 for partitioning the points; a compute block 786 for computing smooth compactly supported basis functions based at least in part on differential surface areas associated with the partitioning of the points; an approximation block 788 for approximating an indicator function for a body based at least in part on the computed basis functions; and a generation block 790 for, based at least in part on values of the approximated indicator function, generating a mesh that represents a surface of the body.

As an example, the mesh mechanism 770 may be configured to perform at least a portion of the method 780 or, for example, the entire method 780.

The method 780 is shown in FIG. 7 in association with various computer-readable media (CRM) blocks 783, 785, 787, 789 and 791. Such blocks generally include instructions suitable for execution by one or more processors (or cores) to instruct a computing device or system to perform one or more actions. While various blocks are shown, a single medium may be configured with instructions to allow for, at least in part, performance of various actions of the method 780, etc. As an example, a computer-readable medium (CRM) may be a computer-readable storage medium. As an example, the blocks 783, 785, 787, 789 and 791 may be provided as one or more modules, for example, such as the one or more modules 270 of the system 250 of FIG. 2.

Figure 8:
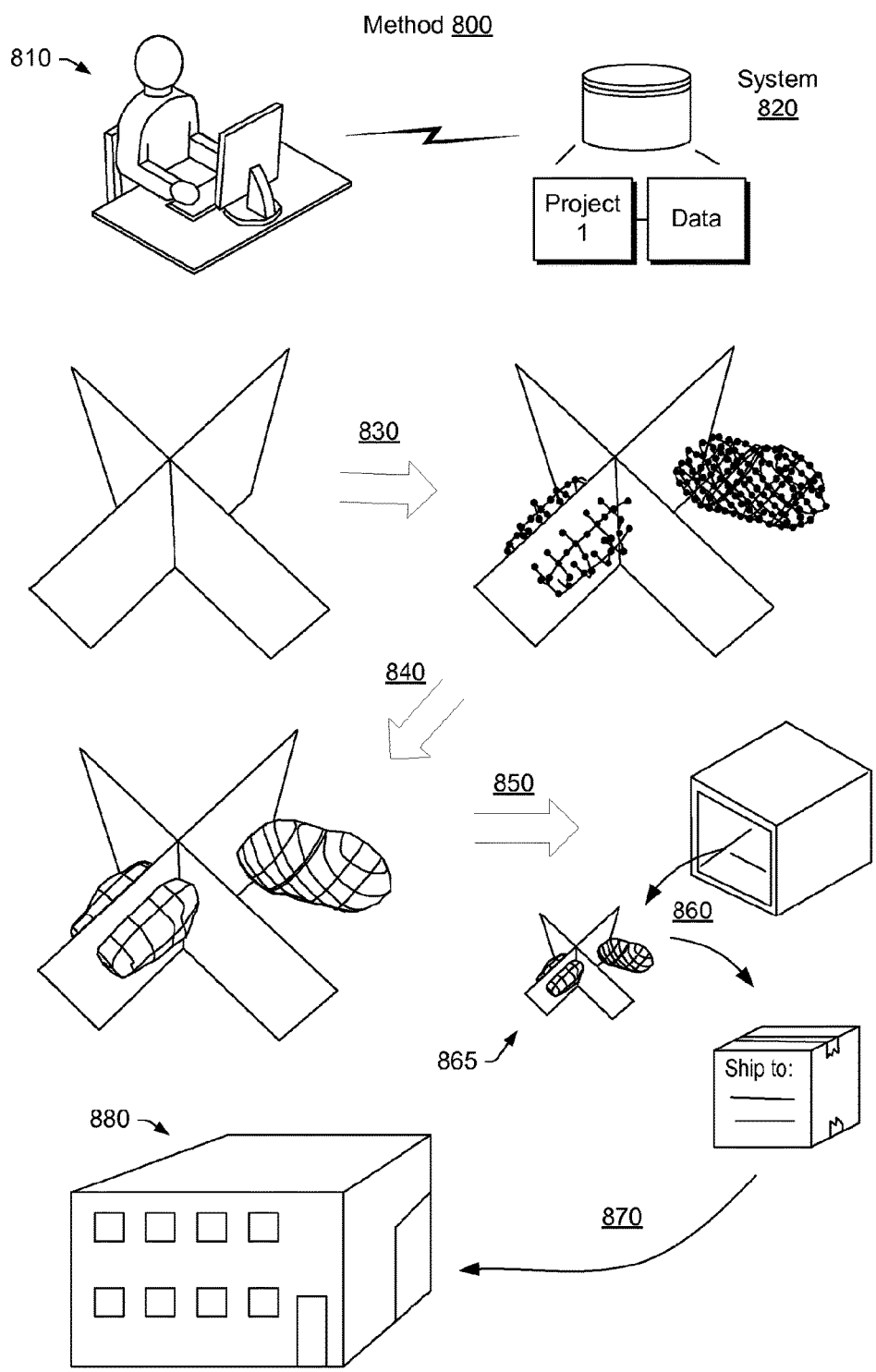
FIG. 8 illustrates an example of a method.

FIG. 8 shows an example of a method 800. As shown in FIG. 8, the method 800 may involve, for example, operations of a user machine system 810 and operations of a back-end system 820 (e.g., for project information, project data, etc.). The method 800 may include interpreting seismic data 830, meshing interpreted data 840, outputting meshed data 850, making a physical object or objects 860 based at least in part on meshed data (see, e.g., object(s) 865), and shipping a made object or objects 870, for example, to a destination 880.

In the example of FIG. 8, the method 800 may include implementing at least a portion of the method 780 of FIG. 7. In such a manner, a workflow may occur in a relatively quick fashion that can include making a physical object or objects. As an example, one or more post-processing techniques may be applied to mesh information (e.g., mesh data), for example, to render information to a physical object or objects. For example, coordinates, colors, letters, numbers, words, etc. may be rendered. As an example, objects may be manufactured in a manner where they can be assembled and disassembled. For example, an object may be within another object that opens (e.g., made as two halves that can be joined to house another object or not). As an example, an object may be made with layers, which may stack, optionally with one or more objects.

As an example, a method can include receiving points representative of at least a portion of a surface of a multi-dimensional geobody; partitioning the points; computing smooth compactly supported basis functions based at least in part on differential surface areas associated with the partitioning of the points; approximating an indicator function for a body based at least in part on the computed basis functions; and, based at least in part on values of the approximated indicator function, generating a mesh that represents a surface of the body. In such an example, the smooth compactly supported basis functions can include vanishing moments. As an example, a wavelet may be defined to include p vanishing moments if a wavelet scaling function can generate polynomials up to degree p−1. A vanishing moment may be characterized by considering how a function decays (e.g., toward infinity).

As an example, smooth compactly supported basis functions may be amenable to multiscale decomposition. For example, an analysis that includes image registration by matching parts of images that differ in one or more regards (e.g., different detectors, different times, etc.). In such an example, crude features may be matched at one scale while finer features are matched at one or more progressively finer scales (e.g., of increasing resolution). As an example, a method may include multiscale processing (e.g., multi-resolution processing, etc.).

As an example, smooth compactly supported basis functions can include wavelet coefficients. For example, wavelet coefficients may be determined, for example, to represent a feature using wavelets (e.g., in one or more dimensions). As an example, consider Haar wavelets with Haar wavelet coefficients.

As an example, a method may include octree-based partitioning that partitions points into respective octree cells. As an example, an octree may be defined as a tree data structure where a node includes eight children. As an example, octrees may be applied to partition a three dimensional space, for example, by recursively subdividing it into eight octants. As an example, for a method that may be applied to a two-dimensional space, quadtrees may be implemented.

As an example, a method may include generating a mesh where generation of the mesh includes contouring. As an example, such a method may include octree-based partitioning to create at least one octree where the contouring includes applying an algorithm that computes a dual cell structure of the at least one octree through a recursive octree walk.

As an example, a method may include generating a mesh by, at least in part, applying a marching cube algorithm. In such an example, the marching cube algorithm may be or include a dual marching cube algorithm.

As an example, a method may include receiving vector information for at least a portion of received points. In such a method, the vector information may include normal vector information for vectors normal to a surface of a multi-dimensional geobody at respective received points (e.g., surface normals).

As an example, a method may include rendering information to a display based at least in part on a generated mesh. In such an example, the method may include generating additional points and repeating the method at least in part by receiving the additional points.

As an example, a method may include making a physical object based at least in part on a generated mesh. For example, consider rendering an object using a 3D printer.

As an example, a system can include a processor; memory operatively coupled to the processor; and one or more modules that include processor-executable instructions stored in the memory to instruct the system to receive a point representative of at least a portion of a surface of a multi-dimensional geobody; associate the point with partitioned points; compute smooth compactly supported basis functions based at least in part on differential surface areas associated with the partitioning of the points; approximate an indicator function for a body based at least in part on the computed basis functions; and, based at least in part on values of the approximated indicator function, generate a mesh that represents a surface of the body. In such an example, the received point may be received from a first network address where at least one of the partitioned points is received from a second, different network address.

As an example, a system can include one or more modules that include processor-executable instructions stored in the memory to instruct the system to transmit information that defines a mesh to a rendering engine to render a representation of the mesh to a display. As an example, a system may include a network interface where a rendering engine is operatively coupled to the system via the network interface.

As an example, one or more computer-readable storage media may include computer-executable instructions to instruct a computer to: receive seismic data of a volume of a geologic environment that includes a geobody; render information to a display based at least in part on the seismic data; receive input to select a point associated with a surface of the geobody based at least in part on the information rendered to the display; generate a mesh based at least in part on the selected point and an approximation of an indicator function; receive input to select another point associated with the surface of the geobody based at least in part on the information rendered to the display; and generate an updated mesh based at least in part on the selected points and a re-approximation of the indicator function.

Figure 9:
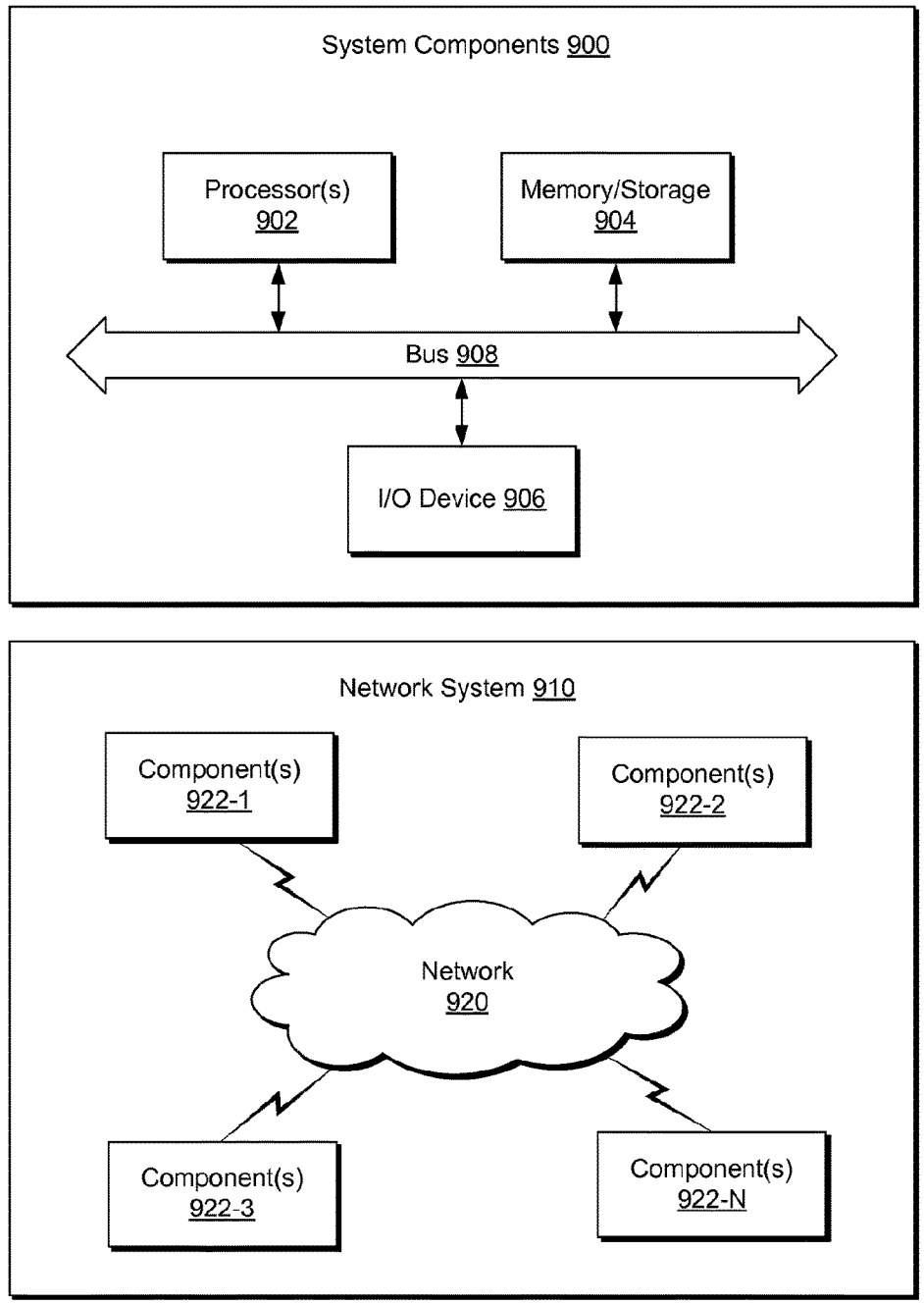
FIG. 9 illustrates example components of a system and a networked system.

FIG. 9 shows components of an example of a computing system 900 and an example of a networked system 910. The system 900 includes one or more processors 902, memory and/or storage components 904, one or more input and/or output devices 906 and a bus 908. In an example embodiment, instructions may be stored in one or more computer-readable media (e.g., memory/storage components 904). Such instructions may be read by one or more processors (e.g., the processor(s) 902) via a communication bus (e.g., the bus 908), which may be wired or wireless. The one or more processors may execute such instructions to implement (wholly or in part) one or more attributes (e.g., as part of a method). A user may view output from and interact with a process via an I/O device (e.g., the device 906). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 910. The network system 910 includes components 922-1, 922-2, 922-3, . . . 922-N. For example, the components 922-1 may include the processor(s) 902 while the component(s) 922-3 may include memory accessible by the processor(s) 902. Further, the component(s) 902-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method for mesh guided interpretation of volumetric seismic data of a subsurface environment, the method comprising:

via a display system, rendering a visualization of at least a portion of the volumetric seismic data of the subsurface environment and rendering a mesh for a multi-dimensional geobody in the subsurface environment wherein the mesh is generated based on reception of points selected via an interpretation process that delineates a boundary representative of the multi-dimensional geobody in the subsurface environment and an approximation of an indicator function;
responsive to selecting at least one additional point that delineates the boundary representative of the multi-dimensional geobody via the interpretation process, as based at least in part on the rendered visualization and the rendered mesh, receiving the at least one additional point;
partitioning the points and the at least one additional point;
computing smooth compactly supported basis functions based at least in part on differential surface areas associated with the partitioning;
re-approximating the indicator function for the geobody based at least in part on the computed basis functions;
based at least in part on values of the re-approximated indicator function, generating an updated mesh;
via the display system, rendering the updated mesh; and
via continuing the interpretation process based at least in part on the rendered updated mesh, generating a set of points wherein the set of points is representative of the multi-dimensional geobody.

2. The method of claim 1 wherein the smooth compactly supported basis functions comprise vanishing moments.

3. The method of claim 1 wherein the smooth compactly supported basis functions are amenable to multiscale decomposition.

4. The method of claim 1 wherein the smooth compactly supported basis functions comprise discontinuous wavelet coefficients, wherein the discontinuous wavelet coefficients comprise Haar wavelet coefficients.

5. The method of claim 1 wherein the partitioning comprises octree-based partitioning that partitions the points and the at least one additional point into respective octree cells.

6. The method of claim 1 wherein the generating the updated mesh comprises contouring.

7. The method of claim 6 wherein the partitioning comprises octree-based partitioning to create at least one octree and wherein the contouring comprises applying an algorithm that computes a dual cell structure of the at least one octree through a recursive octree walk.

8. The method of claim 1 wherein the generating the updated mesh comprises applying a marching cube algorithm.

9. The method of claim 8 wherein the marching cube algorithm comprises a dual marching cube algorithm.

10. The method of claim 1 further comprising receiving vector information for at least a portion of the received points.

11. The method of claim 10 wherein the vector information comprises normal vector information for vectors normal to the surface of a multi-dimensional geobody at respective received points.

12. The method of claim 1 further comprising, via the display system, rendering normal vector information for the updated mesh.

13. The method of claim 1 further comprising making a physical object based at least in part on the updated mesh.

14. A system comprising:
a processor;
memory operatively coupled to the processor; and
processor-executable instructions stored in the memory to instruct the system to:
render a visualization of at least a portion of volumetric seismic data of a subsurface environment and render a mesh for a multi-dimensional geobody in the subsurface environment wherein the mesh is generated based on reception of points selected via an interpretation process that delineates a boundary representative of the multi-dimensional geobody in the subsurface environment and an approximation of an indicator function;
responsive to selection of at least one additional point that delineates the boundary representative of the multi-dimensional geobody via the interpretation process, as based at least in part on the rendered visualization and the rendered mesh, receive the at least one additional point;
partition the points and the at least one additional point;
compute smooth compactly supported basis functions based at least in part on differential surface areas associated with the partitioned points and the at least one additional point;
re-approximate the indicator function for the geobody based at least in part on the computed basis functions;
based at least in part on values of the re-approximated indicator function, generate an updated mesh;
render the updated mesh; and
via continuation of the interpretation process based at least in part on the rendered updated mesh, generate a set of points wherein the set of points is representative of the multi-dimensional geobody.

15. The system of claim 14 comprising processor-executable instructions stored in the memory to instruct the system to transmit information that defines the updated mesh to a rendering engine to render a representation of the mesh to a display.

16. The system of claim 15 wherein the system comprises a network interface and wherein the rendering engine is operatively coupled to the system via the network interface.

17. One or more non-transitory computer-readable storage media comprising computer-executable instructions to instruct a computer to:
render a visualization of at least a portion of volumetric seismic data of a subsurface environment and render a mesh for a multi-dimensional geobody in the subsurface environment wherein the mesh is generated based on reception of points selected via an interpretation process that delineates a boundary representative of the multi-dimensional geobody in the subsurface environment and an approximation of an indicator function;
responsive to selection of at least one additional point that delineates the boundary representative of the multi-dimensional geobody via the interpretation process, as based at least in part on the rendered visualization and the rendered mesh, receive the at least one additional point;
partition the points and the at least one additional point;
compute smooth compactly supported basis functions based at least in part on differential surface areas associated with the partitioned points and the at least one additional point;
re-approximate the indicator function for the geobody based at least in part on the computed basis functions;
based at least in part on values of the re-approximated indicator function, generate an updated mesh;
render the updated mesh; and
via continuation of the interpretation process based at least in part on the rendered updated mesh, generate a set of points wherein the set of points is representative of the multi-dimensional geobody.

\* \* \* \* \*